United States Patent [19]

Lewis

[11] 4,026,714

[45] May 31, 1977

[54] PHOSPHATE GLASS COMPOSITIONS

[75] Inventor: Cyril John Lewis, Runcorn, England

[73] Assignee: Imperial Chemical Industries Limited, London, England

[22] Filed: Aug. 30, 1976

[21] Appl. No.: 718,629

[30] Foreign Application Priority Data

Sept. 19, 1975 United Kingdom ............ 38552/75

[52] U.S. Cl. .......................... 106/47 R; 106/47 Q; 106/54

[51] Int. Cl.$^2$ ...................... C03C 3/16; C03C 3/30

[58] Field of Search ................ 106/47 R, 47 Q, 54

[56] References Cited

UNITED STATES PATENTS

| 2,684,304 | 7/1954 | Weissenberg | 106/47 Q |
|---|---|---|---|
| 2,920,972 | 1/1960 | Godron | 106/47 R |
| 2,996,390 | 8/1961 | Weissenberg et al. | 106/47 Q |
| 2,996,391 | 8/1961 | Weissenberg et al. | 106/47 Q |
| 3,253,934 | 5/1966 | Godron | 106/47 R |
| 3,499,774 | 3/1970 | Weyl | 106/47 R |
| 3,926,649 | 12/1975 | Ray et al. | 106/47 R |
| 3,933,689 | 1/1976 | Ray et al. | 106/47 R |
| 3,935,018 | 1/1976 | Ray et al. | 106/47 R |
| 3,964,919 | 6/1976 | Ray et al. | 106/47 R |

OTHER PUBLICATIONS

Rawson, H., *Inorganic Glass Forming Systems*, (1967), Academic Press, NYC, pp. 172–173.
Takahashi, K., *Advances in Glass Technology*, (1962), Plenum Press, NYC, pp. 366–376.

*Primary Examiner*—Winston A. Douglas
*Assistant Examiner*—Mark Bell
*Attorney, Agent, or Firm*—Cushman, Darby & Cushman

[57] ABSTRACT

A glass having a good combination of anti-misting properties and durability to water is produced from an inorganic glass composition comprising:

a. $P_2O_5$ — 52 to 72 mole %
b. one or more oxides selected from $B_2O_3$, $SiO_2$ and $Al_2O_3$ — in total more than 3.5 mole % and not more than 12 mole %.
c. PbO — 1 to 12 mole% and
d. alkali metal oxides, alkaline earth metal oxides or zinc oxide — in total 4 to 30 mole %.

12 Claims, No Drawings

PHOSPHATE GLASS COMPOSITIONS

This invention relates to inorganic oxide glass compositions and to optical articles made from said compositions.

An article of silicate glass which is exposed to a humid atmosphere when the surface of the glass is at a temperature below the dew point of the atmosphere tends to become misted over due to the condensation of minute droplets of water on the surface of the article. Misting results when the droplets of water do not spread uniformly over the surface of the article. Condensation of droplets of water and thus misting of the surface of a glass article may occur especially when the article is in the form of a relatively thin sheet one side of which is in contact with cold air and the other with warm, moist air as is often the case, for example, with a vehicle windscreen.

Consequently, glass articles through which clear vision is essential, for example, spectacles, lenses of protective goggles, vehicle windscreens and mirrors, may have to be wiped frequently or heated in order to remove the condensed water, or treated with an anti-misting preparation. Anti-misting preparations typically comprise surfactants of various types which form a surface layer on the glass article which reduces the contact angle between the surface and the condensed water thereby promoting the spreading of the droplets. However, the effect is only temporary as during use the surfactants are gradually washed off the surface of the article.

We have found that a surface consisting of an inorganic oxide glass may have a reduced tendency to mist over in a humid atmosphere when compared with the misting which is produced on an article of a normal silicate glass under the same conditions provided the inorganic oxide glass is of defined composition and also provided the glass has a defined maximum transformation temperature, and in our British patent specification No. 1,404,914 we have described an optical article having such a reduced tendency to mist over in which at least part of the surface of the article is an inorganic oxide glass which is a phosphate glass and which has a $P_2O_5$ content of at least 52 mole %, an alkaline earth metal oxide content of 2.7 to 20 mole %, and a transformation temperature of not greater than 300° C.

In our British patent specification No. 1,395,942 we have described glass compositions, some of which when in the form of an article, possess the property of having a reduced tendency to mist over in a humid atmosphere when compared with articles made of normal silicate glass, and which comprise inter alia from 50 to 72 mole % of $P_2O_5$, 1.2 to 3.5 mole % $B_2O_3$, optionally PbO and at least one transition metal oxide, and at least one alkali metal oxide and at least one oxide selected from alkaline earth metal oxides and zinc oxide.

In this latter specification it was stated that if the $B_2O_3$ content of the glass composition is within the range 1.2 to 3.5 mole % there is considerably less tendency for crystalline inclusions to form in the composition during the manufacturing process than is the case where the $B_2O_3$ content is above this range. The formation of crystalline inclusions is of course a serious disadvantage where the glass composition is to be used in optical applications.

In the latter specification it was also stated that if silica or alumina are present in the glass composition they should be present only in trace quantities, that is in an amount up to 1 mole %.

We have now found that, contrary to the teaching of the latter specification, it is possible to prepare phosphate glass compositions having a relatively large proportion of a network-forming oxide, e.g. $B_2O_3$, $SiO_2$, $Al_2O_3$, without at the same time forming crystalline inclusions in the glass composition provided the temperature of the manufacturing process is correctly chosen.

We have also found that by careful choice of the amount of network-forming oxide in a range above that described in the latter specification, and by choice of the transformation temperature of the glass composition, a glass composition may be produced which is substantially more durable to water than are the glass compositions described in British patent specification, Nos. 1,395,942 and 1,404,914, which at the same time retains the property, when in the form of an article, of having a reduced tendency to mist over in a humid atmosphere when compared with the misting which is produced on an article made of a normal silicate glass, and which has a much reduced tendency to form a sticky surface on standing in a humid atmosphere than do the glass compositions of the aforementioned specifications. Although the anti-misting tendency of the glass composition of the present invention may be somewhat reduced when compared with that of the aforementioned specifications the composition possesses a more desirable combination of durability to water and anti-misting property than do the glass compositions generally described in the aforementioned specifications. The glass compositions of the present invention may also be more scratch resistant.

The present invention provides an inorganic oxide glass composition comprising:

$P_2O_5$ — 52 to 72 mole %,
one or more oxides selected from $B_2O_3$, $SiO_2$ and $Al_2O_3$ — in total more than 3.5 mole % and not more than 12 mole %,
PbO — 1 to 12 mole %,
alkali metal oxides, alkaline earth metal oxides and zinc oxide — in total 4 to 30 mole %, there being present in the composition at least one alkali metal oxide and at least one oxide selected from alkaline earth metal oxides and zinc oxide, the composition having a transformation temperature (as hereinafter defined) in the range 180° C to 400° C.

The glass composition is suitably in the form of an optical article, that is an article capable of transmitting or reflecting an optical image by a process involving transmission of light through at least the region adjacent to the surface comprising the inorganic oxide glass. This definition includes lenses, prisms, mirrors, windows and transparent container. Particularly useful optical articles include spectacle lenses, especially toughened lenses for safety spectacles, protective goggles and the like. Such lenses may be coloured, for example for use in welder's goggles. Other particularly useful articles are mirrors which are intended for use in humid environments, for example bathroom mirrors and dental mirrors; windows, particularly vehicle and aeroplane windows; and components of sports equipment, for example face plates and lenses of masks and goggles, e.g. underwater diving masks and ski goggles.

Only that part of the surface of the article which is required to have reduced misting properties need be of the inorganic oxide glass having the defined composition. For example, the article may be a window or windscreen which is a laminate and which has one outer surface made of the defined inorganic oxide glass and the other outer surface made of a normal silicate glass. Thus, in the case of a vehicle windscreen the inner surface may with advantage be of the defined inorganic oxide glass. Of course, substantially the whole of the surface of the optical article may, if desired, be of the defined inorganic oxide glass. The optical article may be made substantially completely of the defined inorganic oxide glass.

The glass composition may contain other inorganic oxide components provided the other components are present in amounts such that the transformation temperature of the glass composition is within the range 180° C to 400° C. In general, other inorganic oxide glass components may be present in a total amount of no more than 5 mole %. For example, the glass composition may include one or more transition metal oxide components, especially where it is desired to produce a coloured glass composition.

Water may also be present in the glass composition but for the purposes of definition of the composition water is not considered as forming a part of the composition. Thus, the mole percentages of the components as hereinbefore defined are calculated on the basis that any water which may be present in the composition is neglected for the purposes of the calculations. Water may in fact be present in the glass composition in an amount of up to about 5% by weight of the total of the components hereinbefore specified as forming the glass composition.

Articles made from the defined inorganic oxide glass composition may be non-misting under certain conditions of humidity and temperature, that is, they may exhibit no misting and this, of course, is preferred. However, under some conditions of humidity and temperature the articles may show some misting but the amount of misting will be less than that obtained with normal silicate glass articles under the same conditions. In order that articles made from the glass composition should show a substantial anti-misting effect it is preferred that the composition contains at least 58 mole % of $P_2O_5$. On the other hand, because the sensitivity of the glass composition to water increases (that is the water durability becomes less) as the proportion of $P_2O_5$ in the composition increases, it is preferred that the composition contains no more than 68 mole % of $P_2O_5$.

As the amount of network-forming oxide in the composition (that is the amount of $B_2O_3$, $SiO_2$ or $Al_2O_3$ or a combination of two or more thereof) increases the transformation temperature of the glass composition and the durability of the composition to water increases.

$B_2O_3$ is preferred as the network-forming oxide as it is readily incorporated into the glass composition during manufacture. For a good combination of anti-misting property and durability to water an amount of $B_2O_3$ in the range 4 to 10 mole % is preferred.

Where $Al_2O_3$ or $SiO_2$ is the network-forming oxide, or forms a part of the network-forming oxide, then a processing temperature higher than that used in the case of $B_2O_3$ may be required. Furthermore, care should be taken to ensure that the amount of $Al_2O_3$ or $SiO_2$ present in the glass composition does not result in a transformation temperature of the glass above 400° C. It is preferred that the glass composition contains no more than 6 mole % of $Al_2O_3$ and no more than 5 mole % of $SiO_2$.

The PbO is present in the glass composition in order that the refractive index of the glass may, by variation of the amount of PbO, be capable of being adjusted to a desired value, and particularly to a refractive index of 1.523, that is the refractive index of a spectacle glass. The amount of PbO present in the glass composition will depend on the refractive index which is desired and on the amounts of the other components and may readily be determined by means of simple experiment. The amount of PbO will generally lie in the range 2 to 8 mole %.

The glass composition contains at least one alkali metal oxide. The alkali metal oxide has the effect of increasing the anti-misting effect and it also increases the processability of the inorganic oxide components during production of the glass composition. It is preferred that the glass composition contains at least 5 mole % and more preferably at least 10 mole % of at least one alkali metal oxide. Particularly suitable alkali metal oxides are $Li_2O$ or $Na_2O$ or a mixture thereof. The glass composition may contain $K_2O$ as alkali metal oxide but as $K_2O$ may have an adverse effect on the durability of the glass to water the amount of $K_2O$ in the glass is preferably less than 5 mole %, more preferably less than 1 mole %.

The alkaline earth metal oxide may be one or more oxides of beryllium, magnesium, calcium, strontium or barium, with MgO, CaO and BaO or mixtures of any two or more thereof being preferred. As the amount of alkaline earth metal oxide, or ZnO in the glass composition increases the durability of the glass composition to water increases and it is preferred that the composition contains at least 5 mole % of at least one oxide selected from alkaline earth metal oxides and ZnO. Increase in the amount of alkaline earth metal oxide or ZnO in the composition also increases the transformation temperature of the glass composition and in order that the transformation temperature should not be too high it is preferred that these latter oxides form no more than 20 mole % of the glass composition. For a good combination of anti-misting property and durability to water it is preferred that the glass composition comprises from 3 to 15 mole % of alkaline earth metal oxide or ZnO.

The glass composition should have a transformation temperature in the range 180° C to 400° C.

The transformation temperature is defined as the value determined by differential thermal analysis of a sample of the glass using the du Pont Differential Thermal Analyser according to the following procedure. A sample of the powdered glass and a reference sample of pure powdered silica are heated at a programmed rate of temperature increase of 20° C/min, and a graph is obtained of the temperature difference between the samples plotted against the temperature of the reference sample. This curve typically has a linear portion of small slope and a second linear portion or larger negative slope at higher temperatures. The two linear portions are produced so that they intersect, and the transformation temperature is taken as the temperature corresponding to the point of intersection.

As the transformation temperature of the glass composition increases the anti-misting property of the composition generally decreases and the durability of the composition to water increases. For a good combination of anti-misting property and durability to water it is preferred that the transformation temperature of the glass composition be greater than 250° C, more preferably greater than 300° C. In order that the anti-misting property of the glass composition should not be unduly reduced it is preferred that the transformation temperature be less than 380° C.

The glass composition may be prepared by heating a mixture of the inorganic oxides. The inorganic oxides may be in the form of appropriate precursors. By "precursor" is meant a compound which on heating will react with the other components present to give the same chemical composition in the product as if the corresponding oxide has been used. Usually reaction of a precursor will occur with evolution of one or more volatile compounds, for example water, carbon dioxide and ammonia. Thus, suitable precursors of phosphoric oxide include phosphoric acid and ammonium phosphates, while carbonates may be used as precursors of metal oxides. A single compound may be a precursor of more than one oxide. For example, sodium phosphate may be a precursor of $Na_2O$ and $P_2O_5$.

The heating may be carried out in a two-stage process, in which some or all of the components are first heated together at a relatively low temperature, for example 500°–600° C, to give a glassy mixture (conveniently referred to as the premelt), which is than refined at a higher temperature, for example 800°–1000° C. The duration of the first stage of the heating process, to form the premelt, is generally from 1 to 8 hours and may depend on the size of the batch. For example, when preparing a 2 kg batch, a time of 2½ to 4½ hours is convenient. If less than all of the components are present at the initial heating stage the remaining material may be added subsequently, before or during the refining stage. This method is convenient for small scale laboratory preparations, but alternatively the components may be mixed together and heated, for example to 800°–1000° C, in a single stage operation. The addition of the components may be made all at once or sequentially in a batch process, but it may be desirable, particularly when operating upon a large scale, to form the glass in a continuous process in which the mixture of components is continually or periodically added to, and glass removed from, a reaction vessel maintained at the refining temperature.

The precise temperatures to be used during processing will depend on the relative amounts of the various components of the glass composition and in particular on the amount of and the nature of the network-forming oxide, that is, $B_2O_3$, $SiO_2$ and $Al_2O_3$. Thus, with an amount of network-forming oxide at the upper end of the range, for example of the order of 10 mole %, it may be necessary to use a temperature above 500° C in order to form a pre-melt and to use a temperature above 800° C during the refining stage. For example, it may be necessary to form the pre-melt at a temperature up to 750° C and to carry out the refining at a temperature up to 1000° C or even 1200° C. The use of higher temperatures during formation of the pre-melt is especially necessary where the network-forming oxide is or includes $Al_2O_3$ or $SiO_2$ or a combination of $Al_2O_3$ and $SiO_2$.

During the refining stage water is gradually lost, the glass network becomes more highly cross-linked, and the viscosity and transformation temperature of the glass increase. Small amounts of volatile oxide components, for example $P_2O_5$, may be lost during the refining stage, and it is desirable to keep the temperature as low as possible when refining the glass in order to minimise any such loss.

In order to minimise such losses the refining stage, and if desired the formation of the pre-melt, may be carried out in a closed crucible.

A glass of a given composition may have a range of transformation temperatures depending upon the refining conditions used up to a limiting value determined by the composition. Glass compositions of the invention having transformation temperatures within the range of 180° to 400° C may be obtained by routine experimentation involving selection of the appropriate process conditions, for example time, temperature and batch size, in the refining stage so as to control the amount of water lost during this step. The length of refining time required for a particular glass composition to reach a particular transformation temperature cannot be specified as it depends upon the size of the batch, the type of furnace and crucible used, the exact temperature of the furnace, the furnace atmosphere and other variables. In general, the refining time may vary from 1 hour to 1 week, depending upon the desired transformation temperature and the variables listed above. In general, as the refining time and/or temperature are increased the amount of water which is lost is increased resulting in an increase in the transformation temperature of the glass composition. The time required may be substantially reduced by bubbling an inert gas, for example air, through the molten glass during the refining stage. However, if a given glass composition is refined until it reaches a given transformation temperature, properties such as durability, anti-misting property, and refractive index will be substantially reproducible from one batch of that composition to another.

Glass compositions of the invention may be said to be non-misting if a surface of an article made from the glass composition remains clear when it is equilibrated in air at normal ambient temperatures and at least 70% relative humidity then cooled to below the dew point of the surrounding atmosphere. This may be tested in an apparatus in which identical samples of the test glass and of silicate glass are enclosed in an atmosphere of controlled humidity and cooled by contact with a cooling surface. The apparatus is described in the aforementioned British patent specification No. 1,404,914.

Alternative and simpler tests which may be applied as anti-misting tests include:

a. cooling a sample of the test glass to 0° C and removing it to an atmosphere at 20° C, 80% relative humidity, b. placing the glass which has been equilibrated at any temperature between 0° C and 30° C into an atmosphere at 37° C, 100% relative humidity, and c. subjecting a sample of the test glass of 20° C to the human breath (37° C, 100% relative humidity).

The glass may be regarded as non-misting if it does not mist under any one of these test conditions, and as having anti-misting properties if it mists to a lesser extent, or for a shorter time, than does an article of a silicate glass under the same conditions.

If an article made from a glass composition of the invention which is non-misting or which has anti-misting properties after equilibration under ambient conditions is stored for a period of time under conditions of low humidity and/or low temperature its non-misting or anti-misting effect may be lost or may be much reduced, but it will be recovered on re-exposure to more humid conditions. Thus, the article may lose its anti-misting property after prolonged storage at 0° C and relative humidities as high as 50% but will recover the property upon equilibration under ambient conditions. "Ambient conditions" may be regarded as temperatures between 15° and 40° C and relative humidity not less than 50%. The period of storage at low humidity and/or temperature required to cause loss of anti-misting properties or reduction of anti-misting properties is usually between 1 day and 1 week, whereas exposure to normal ambient conditions may bring about recovery of anti-misting properties within a few hours. Recovery may be accelerated by exposure to an atmosphere of high humidity at ambient temperature, and may then take place within a few hours or possibly after a few minutes.

Non-misting or anti-misting properties may also be reversibly lost if articles of the glass composition are thoroughly washed in water and wiped dry. Again, equilibration under ambient conditions will restore the non-misting or anti-misting property, generally within a few hours or less.

The durability of the glass compositions is a function of the rate at which they are attacked by water, which may be expressed either as the rate of loss of weight of a standard sample expressed in units of %/minute at a given temperature, or as the rate of erosion of a glass surface expressed in units of microns/minute at a given temperature.

The rate of loss of weight at 100° C is determined by the following procedure. Approximately 2g of molten glass is poured on to a steel plate and allowed to cool. The resulting smooth disc of glass, approximately 2 cm in diameter and 0.3 cm thick, is weighed, immersed in boiling water for 1 hour, dried and reweighed. The weight loss divided by the initial weight and multiplied by 100/60 gives the percentage weight loss/minute. However, as the glass compositions of the present invention generally have such a high durability that the above-described test procedure is not sufficiently sensitive to give an accurate result it is preferred to measure durability by an alternative test procedure in which the glass composition is ground and sieved to provide approximately 10g of glass powder of particle size 300–500 μm (30 –52 mesh BS 410). Approximately 5g of the powdered glass is added to a weighed sintered glass crucible having a No. 3 sinter, that is, a sinter having an average pore diameter of 20–30 μm. The contents of the crucible are washed with distilled water then with acetone and dried under a vacuum of less than 1 mm Hg air pressure at room temperature for 30 minutes.

The crucible and its contents are weighed accurately to determine the initial weight of the glass. A constant-head device is then arranged to maintain a level of 3 cm of distilled water at 20° C in the crucible, which ensures that water flows through the sinter at a rate of approximately 4 ml/minute.

After 24 hours the crucible and its contents are washed with acetone, dried in vacuum as described above and reweighed to determine the final weight of the glass. The rate of erosion is calculated from the equation $$X = 0.28 \left[ 1 - \left( \frac{W_2}{W_1} \right)^{1/3} \right]$$

where
$X$ = rate of erosion ($\mu$m/minute)
$W_1$ = initial weight of glass ($g$)
$W_2$ = final weight of glass ($g$)
The mean of two determinations is taken.

It is preferred that the glass compositions of the present invention have a durability to water such that the rate of surface erosion in water at 20° C is less than $5 \times 10^{-4}$ μm/min, more preferably less than $1 \times 10^{-4}$ μm/min.

Glass compositions of the invention may be fabricated into articles by any suitable means, e.g. hot-pressing or by pouring a molten glass composition into a suitably shaped mould. Such fabricating operations may be followed by finishing operations such as grinding and polishing, especially where an optical article, e.g. a spectacle lens, is to be produced. Spectacle lenses may be plain lenses or ophthalmic corrective lenses, and may be toughened by processes well known for silicate glass lenses. For example they may be heated briefly to 500° C then cooled rapidly in a stream of cold air.

The glass compositions may be formed into articles which are laminates of two or more layers. In the case of two-layer laminates one layer may be composed of the inorganic oxide glass and the other may be of silicate glass or plastics material. Thus, for example, a thin layer of the inorganic oxide glass composition of the invention which is non-misting or anti-misting may be laminated to a sheet of silicate glass to give a non-misting or anti-misting glass suitable, for example, for vehicle windows and bathroom mirrors. In the case of laminates of three or more layers, one or both of the outer layers may be composed of the inorganic oxide glass composition of the invention and the other layers may be of other materials. As an example of this type of laminate, a vehicle windscreen may be made with one outer layer of silicate glass, an inner layer of tough plastics material, for example polyvinly butyral, and a second outer layer of inorganic oxide glass. Such a windscreen installed with the inorganic oxide glass surface on the interior of the vehicle will exhibit greatly reduced misting of the interior surface in cold weather. As a further example, a mirror may be formed from an outer layer of the inorganic oxide glass, a layer of silicate glass, a reflective layer of silver and an opaque backing sheet.

A sheet of transparent plastics material, for example polymethyl methacrylate, may have thin sheets of inorganic oxide glass laminated to one or both surfaces to provide both scratch-resistance and non-misting or anti-misting properties.

Laminates comprising at least one outer layer of inorganic oxide glass may be made by a variety of processes. For example a laminate comprising one layer of inorganic glass and one layer of polymethyl methacrylate may be made by processes including contacting a preformed inorganic oxide glass sheet with monomer and bringing about polymerisation of the monomer; by extrusion of inorganic oxide glass sheet and polymer sheet from adjacent extruders and bringing them into contact in the heat-softened state; and by sticking preformed sheets of inorganic oxide glass and polymer together by means of adhesive.

It is of course desirable in making laminated articles to match as closely as possible the thermal coefficients of expansion of the different layers in order to avoid delamination caused by changes in temperature. The need to match coefficients of expansion is, however, less compelling if one layer is extremely thin or if an intervening layer such as an adhesive is sufficiently flexible to accommodate some of the strain caused by differential expansion. Flexible polyurethane resins may be suitable adhesives for this purpose.

Laminates of inorganic oxide glass to silicate glass may be made by processes including sticking together preformed sheets with a suitable adhesive; melting inorganic oxide glass powder on the surface of newly formed silicate glass sheet while the latter is still hot; sintering inorganic glass powder upon the surface of preformed silicate glass sheet and flame-spraying inorganic oxide glass upon a silicate glass surface.

Methods such as powder coating, sintering flame-spraying, sputtering and vacuum evaporation may also be used to produce a thin coating of inorganic oxide glass upon shaped articles, for example lenses, formed from other glass or plastics materials, thereby providing an article with substantially permanent non-misting or anti-misting properties.

The invention is further illustrated by the following Examples in which all parts are expressed as parts by weight.

EXAMPLE 1

121 parts of 88% by weight phosphoric acid solution in water, 4 parts of $B_2O_3$, 3 parts of $Li_2CO_3$, 8 parts of $Na_2CO_3$, 2 parts of MgO, 4 parts of $CaCO_3$ and 9 parts of PbO were thoroughly mixed by stirring with a high speed stirrer to form a slurry. The slurry was then charged to an alumina crucible and the crucible and contents were heated in an oven at a temperature of 600° C for 2 hours. The slurry charged to the crucible had been converted to a solid paste.

The crucible and contents were thn heated in a furnace at a temperature of 1100° C for 24 hours and the resultant clear glass was poured from the crucible into steel moulds to form discs 2½ inches in diameter and ½ inch thick.

The glass discs were shown by chemical anslysis to have the following composition, in mole %, $P_2O_5$ 61%
$B_2O_3$ 7.6%
$Li_2O$ 5.1%
$Na_2O$ 8.1% CaO 5.8%
MgO 5.4%
PbO 5.2%
$Al_2O_3$ 1.8%

The $Al_2O_3$ in the glass composition resulted from dissolution in the composition of some of the alumina of the alumina crucible.

The glass composition had a transformation temperature of 340° C and a rate of surface erosion in water at 20° C, measured by the method as hereinbefore described, of $6 \times 10^{-5}$ μm per minute.

The glass discs were equilibrated by standing in a chamber containing air at a temperature of 20° C and a relative humidity of 100%.

Discs removed from the chamber were non-misting when breathed upon, and after the discs had been allowed to stand at 20° C and 60% relative humidity for 3 months the discs were still non-misting when breathed upon and had surfaces which showed no signs of becoming sticky.

By way of comparison a disc made from a glass having the following composition, in mole %

$P_2O_5$ — 68.3
$B_2O_3$ — 2.4
$Na_2O$ — 14.6
$Li_2O$ — 4.9
MgO — 4.9
CaO — 4.9 and a transformation temperature of 155° C had a rate of surface erosion in water at 20° C of $4 \times 10^{-4}$ μm per minute.

The discs were non-misting when tested following the procedure described above.

EXAMPLE 2

The procedure of Example 1 was followed to produce glass discs except that the glass was produced from a mixture of 123 parts of 88% phosphoric acid solution in water, 4 parts of $B_2O_3$, 3 parts of $Li_2CO_3$, 9 parts of $Na_2CO_3$, 2 parts of MgO, 4 parts of $CaCO_3$ and 8 parts of PbO and the glass was shown by chemical anaylsis to have a mole % composition of $P_2O_5$ — 61.4%
$B_2O_3$ — 5.9%
$Li_2O$ — 5.5%
$Na_2O$ — 7.2%
CaO — 6.1%
MgO — 5.4%
PbO — 5.3%
$Al_2O_3$ — 3.2%

The $Al_2O_3$ in the glass composition resulted from dissolution in the composition of some of the alumina of the alumina crucible.

The glass composition had a transformation temperature of 336° C and a rate of surface erosion in water at 20° C of $3 \times 10^{-5}$ μm per minute.

When the glass discs were tested following the procedure of Example 1 they were shown to be non-misting after equilibration in a humid atmosphere, and after standing for 3 months they were still non-misting and showed no sign of becoming sticky.

What we claim is:
1. An inorganic oxide glass composition comprising
   $P_2O_5$ — 52 to 72 mole %,
   one or more oxides selected from $B_2O_3$, $SiO_2$ and $Al_2O_3$ — in total more than 3.5 mole % and not more than 12 mole %.
   PbO — 1 to 12 mole %,
   alkali metal oxides, alkaline earth metal oxides or zinc oxide — in total 4 to 30 mole %,
there being present in the composition at least one alkali metal oxide and at least one oxide selected from alkaline earth metal oxides and zinc oxide, the composition having a transformation temperature in the range 180° C to 400° C.

2. An inorganic oxide glass composition as claimed in claim 1 which contains at least 58 mole % of $P_2O_5$.

3. An inorganic oxide glass composition as claimed in claim 1 which contains not more than 68 mole % of $P_2O_5$.

4. An inorganic oxide glass composition as claimed in any one of claim 1 which contains from 4 to 10 mole % of $B_2O_3$.

5. An inorganic oxide glass composition as claimed in any one of claim 1 which contains not more than 6 mole % of $Al_2O_3$.

6. An inorganic oxide glass composition as claimed in any one of claim 1 which contains not more than 5 mole % of $SiO_2$.

7. An inorganic oxide glass composition as claimed in any one of claim 1 which contains from 2 to 8 mole % of PbO.

8. An inorganic oxide glass composition as claimed in any one of claim 1 which contains at least 5 mole % of at least one alkali metal oxide.

9. An inorganic oxide glass composition as claimed in any one of claim 1 which contains at least 5 mole % of at least one oxide selected from alkaline earth metal oxides and zinc oxide.

10. An inorganic oxide glass composition as claimed in any one of claim 1 which contains not more than 20 mole % of oxide or oxides selected from alkaline earth metal oxides and zinc oxide.

11. An inorganic oxide glass composition as claimed in any one of claim 1 having a transformation temperature of less than 380° C.

12. An inorganic oxide glass composition as claimed in any one of claim 1 having a transformation temperature of greater than 250° C.

* * * * *